(12) United States Patent
Biosca Munts et al.

(10) Patent No.: US 10,286,878 B2
(45) Date of Patent: May 14, 2019

(54) WINDSCREEN WIPER DEVICE FOR LARGE CURVED WINDSCREENS

(71) Applicant: DOGA, S.A., Barcelona (ES)

(72) Inventors: Josep Biosca Munts, Barcelona (ES); Carlos Chicón Montoya, Barcelona (ES); José Antonio Montero Sánchez, Barcelona (ES)

(73) Assignee: DOGA, S.A., Barcelona (ES)

( * ) Notice: Subject to any disclaimer, the term of this patent is extended or adjusted under 35 U.S.C. 154(b) by 86 days.

(21) Appl. No.: 15/517,667

(22) PCT Filed: Apr. 26, 2016

(86) PCT No.: PCT/ES2016/070307
§ 371 (c)(1),
(2) Date: Sep. 5, 2017

(87) PCT Pub. No.: WO2016/174293
PCT Pub. Date: Nov. 3, 2016

(65) Prior Publication Data
US 2018/0134257 A1    May 17, 2018

(30) Foreign Application Priority Data

Apr. 30, 2015   (ES) .................................. 201530593

(51) Int. Cl.
*B60S 1/34*   (2006.01)
*B60S 1/38*   (2006.01)
(Continued)

(52) U.S. Cl.
CPC ........... *B60S 1/3486* (2013.01); *B60S 1/3801* (2013.01); *B60S 1/522* (2013.01); *B60S 1/524* (2013.01);
(Continued)

(58) Field of Classification Search
CPC .... B60S 1/3406; B60S 1/3486; B60S 1/3404; B60S 1/3415; B60S 1/524; B60S 1/522; B60S 3001/3824
(Continued)

(56) References Cited

U.S. PATENT DOCUMENTS 2,790,195 A * 4/1957 Wrobel ................. B60S 1/3406
                                                    15/250.23
3,076,991 A * 2/1963 MacPherson ......... B60S 1/3406
                                                    15/250.23
(Continued)

FOREIGN PATENT DOCUMENTS

DE       102004016251 A1   10/2005
EP           1176069 A2    1/2002

*Primary Examiner* — Gary K. Graham
(74) *Attorney, Agent, or Firm* — Julie K. Staple

(57) ABSTRACT

A windshield wiper device for large size curved windshields comprising first and second arms hingedly connected to each other at a distal end by a main spacer and reciprocatingly operable. The device further comprises a windshield wiper blade rockingly mounted relative to said main spacer through rocking means and a secondary spacer mounted on the distal end in redundancy with said main spacer. The rocking means comprise a first toothed member integral with said secondary spacer and a second toothed member integral with said wiper blade, which are mounted meshed with one another to cause the rocking of said wiper blade about time longitudinal axis thereof in the rocking direction opposite to the direction of reciprocating movement of said first and second arms.

11 Claims, 4 Drawing Sheets

(51) Int. Cl.
*B60S 1/42* (2006.01)
*B60S 1/52* (2006.01)

(52) U.S. Cl.
CPC .......... *B60S 1/42* (2013.01); *B60S 2001/3824* (2013.01)

(58) Field of Classification Search
USPC ..................................................... 15/250.23
See application file for complete search history.

(56) References Cited

U.S. PATENT DOCUMENTS

| | | | | |
|---|---|---|---|---|
| 3,247,540 A * | 4/1966 | Howard | ................ | B60S 1/3406 15/250.23 |
| 4,546,518 A | 10/1985 | Harbison et al. | | |
| 9,371,058 B2 * | 6/2016 | Goddard | ............... | B60S 1/3486 |

* cited by examiner

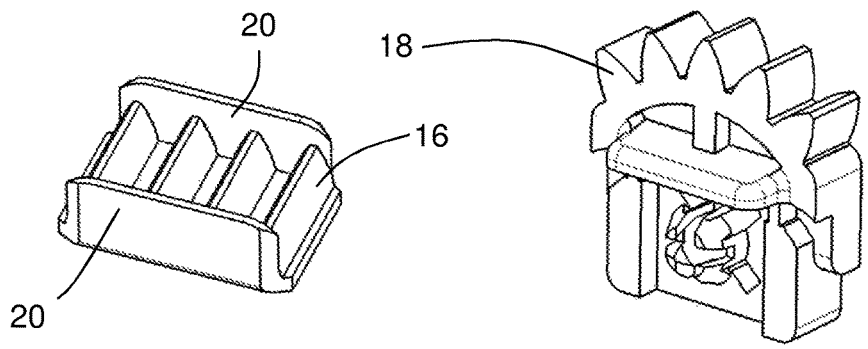
FIG. 2
FIG. 3
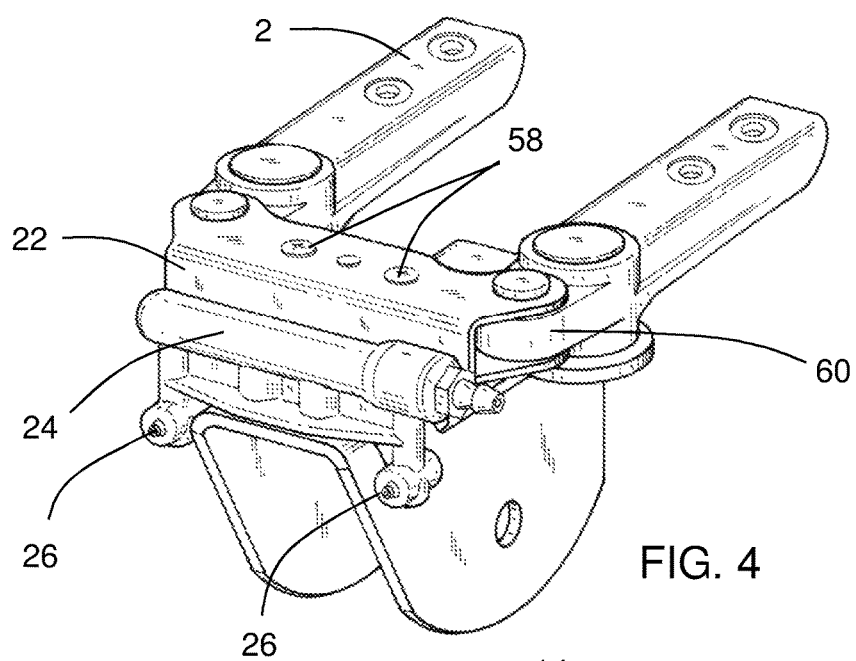
FIG. 4
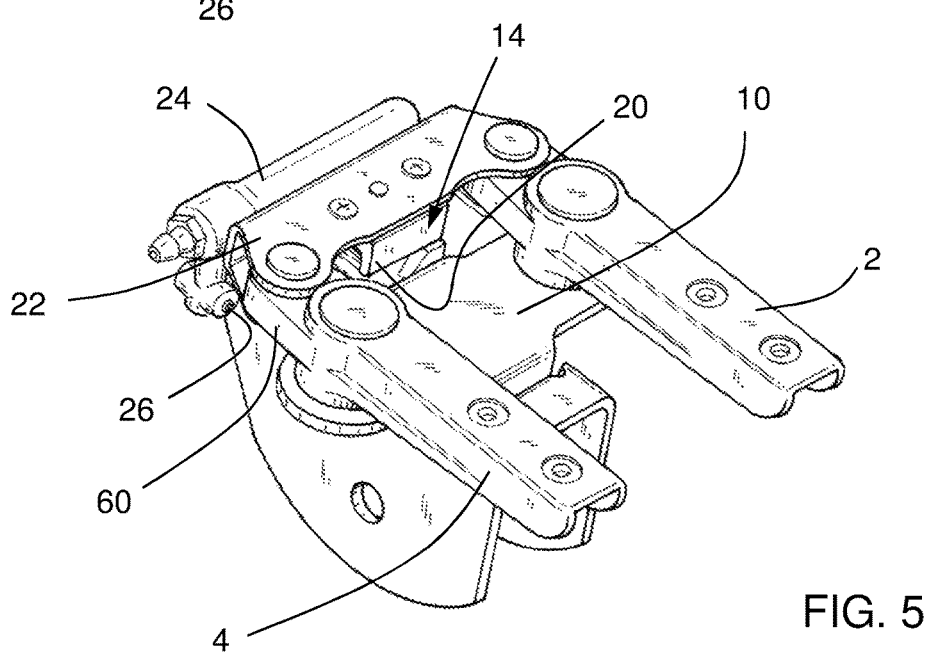
FIG. 5

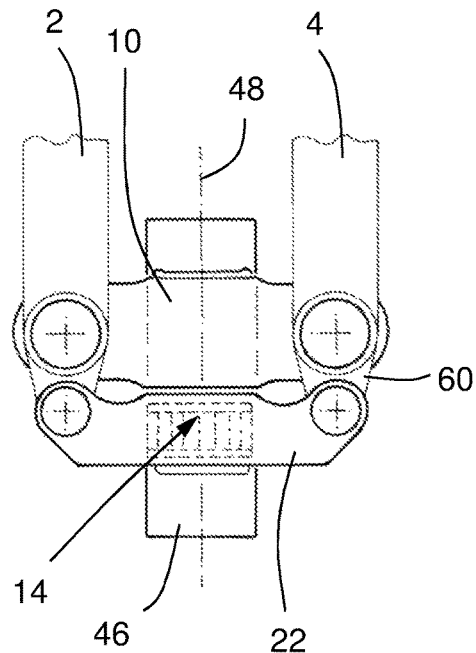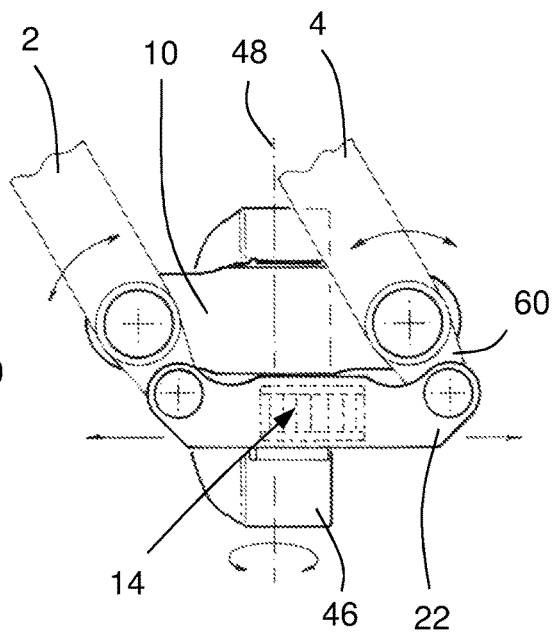
FIG. 6A  FIG. 6B
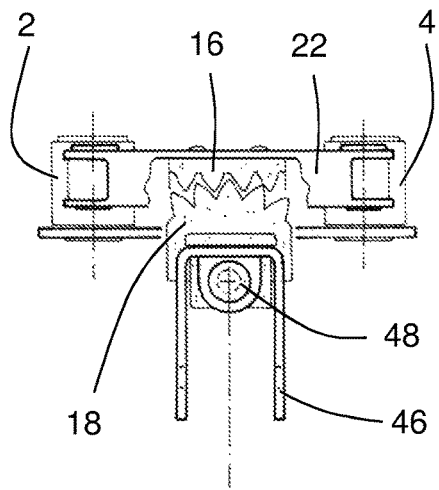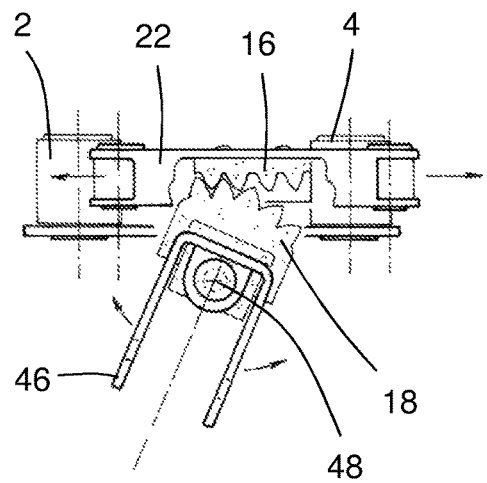
FIG. 7A  FIG. 7B

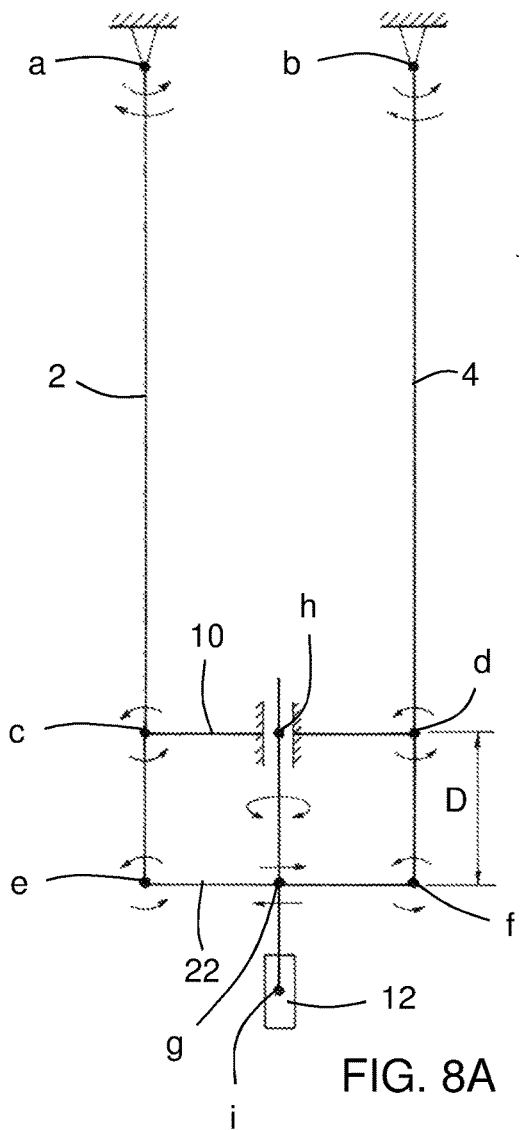
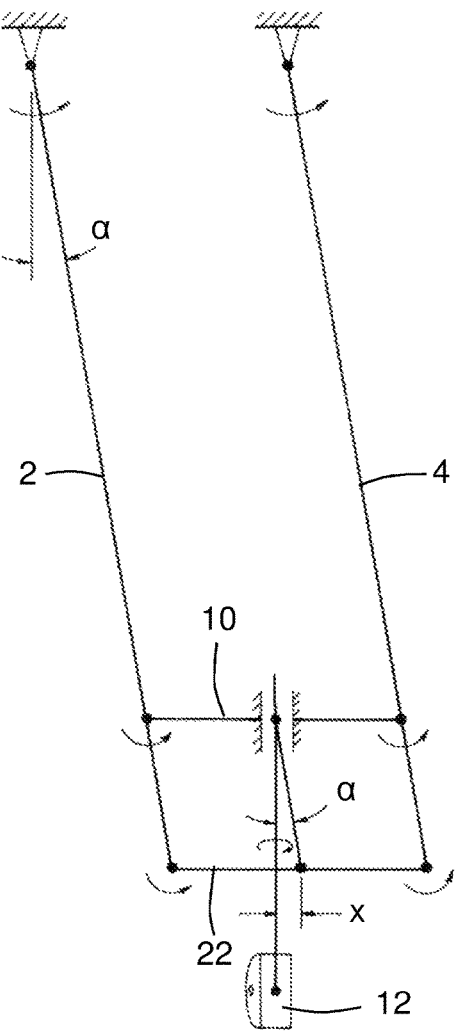
FIG. 8A
FIG. 8B
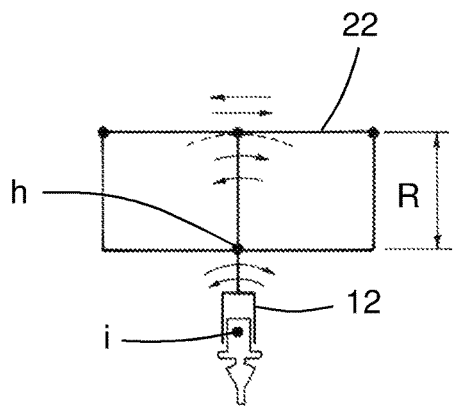
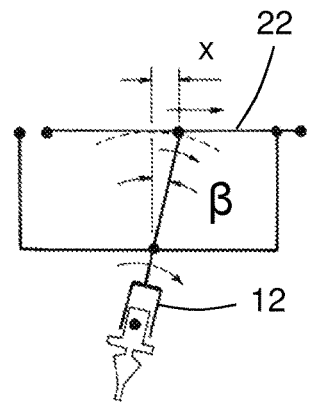
FIG. 9A
FIG. 9B

WINDSCREEN WIPER DEVICE FOR LARGE CURVED WINDSCREENS

CROSS REFERENCE TO RELATE APPLICATIONS

This application claims priority to PCT/ES2016/070307 filed Apr. 26, 2016 which claims priority to P201530593 (ES) filed Apr. 30, 2015.

FIELD OF THE INVENTION

The invention relates to a windshield wiper device for large size curved windshields comprising: first and second arms hingedly connected to each other at a distal end by a main spacer, said first and second arms being reciprocatingly operable at a proximal end and a windshield wiper blade rockingly mounted about a longitudinal axis relative to said main spacer through rocking means.

STATE OF THE ART

In recent years, vehicle manufacturers have been creating windshield designs in which safety, visibility, aerodynamic forms and low consumption have been given priority. These requirements lead to curved geometrical shapes which are hard to clean with traditional windshield wiper devices.

Particularly, when it is a matter of cleaning large glazed surfaces of curved windshields, it is especially important to achieve an adequate angle of incidence of the wiper blade. In the art, the angle of incidence formed by the wiper blade relative to the windshield wiper is also known as the attack angle.

In the case of agricultural vehicles, tractors and public work machinery, the panes are taller than wide. Due to this, it is necessary to apply a sensibly rectangular wiping pattern and the sizing of the components requires large size parts. To overcome this difficulty, for some years now windshield wiper devices of a pantograph type have been used. This type of device consists of first and second arms hingedly connected to each other at a distal end by way of a spacer. At the proximal end opposite to the distal end, the arms are reciprocatingly drivable by a motor. Furthermore, a windshield wiper blade is mounted at the distal end.

The working conditions of agricultural, public works and similar vehicles are such as to require a robust, durable and reliable windshield wiper design. Frequently with a view to working conditions which are at times extreme.

Under these conditions, an inappropriate attack angle of the wiper blade affects the efficiency of the wipe and the durability of the equipment. The attack angle is understood to be the angle determined by the axis of the wiping lip of the wiper blade with the perpendicular at the curve of the windshield, at any of the points of its wiping trajectory. It is well known that the inappropriate attack angle involves noise, jumping of the wiper blade, defective cleaning and premature wear which affects the entire windshield cleaning equipment.

To solve these problems certain solutions have been proposed in the state of the art.

EP 1176069 A1 discloses a pantograph windshield wiper device for earth moving heavy machinery having curved windows. The solution proposed in EP 1176069 A1 has kinematic links which can be easily blocked by the scissors effect. On the other hand, the kinematic pairs for angle compensation can corrode easily. Furthermore, the design is very sensitive to mechanical fatigue and premature wear.

U.S. Pat. No. 4,546,518 A discloses a pantograph windshield wiper device with attack angle compensation. The wiper blade is associated with one of the support arms by way of a ball joint. The cleaning stresses are concentrated on a single joint such that the system is scarcely robust and may easily deteriorate since the ball joint is exposed to external agents which may adversely affect its functionality. Furthermore, this solution is only applicable to small size slightly curved panes, since the possibility of correcting the attack angle is very limited by the ball joint. Finally, replacement of the wiper blade in this case obliges the replacement of the entire windshield wiper device, namely, the arms and the wiper blade.

SUMMARY OF THE INVENTION

It is an object of the invention to provide a windshield wiper device for large size curved surfaces of the type indicated at the beginning, which is simple, robust for operating under demanding working conditions and is easy to maintain at the time of replacing the wiper blade. Furthermore, the invention also considers the problem of not giving up the advantages of the known windshield wiper devices having proven performance for their operation on production vehicles on the market.

This purpose is achieved by a windshield wiper device of the type indicated at the beginning, characterized in that it further comprises a secondary spacer mounted on said distal end and which works redundantly with said main spacer, in that said rocking means comprise: a first toothed member integral with said secondary spacer and a second toothed member integral with said wiper blade, and in that said first and second toothed members are mounted meshed with one another to cause the rocking of said wiper blade about said longitudinal axis in the rocking direction opposite to the direction of reciprocating movement of said first and second arms.

This configuration offers several advantages. Firstly, the mechanical dynamic loads are shared proportionately by the entire kinematic chain. Thanks to this, overstress concentrated on a single link of the kinematic chain is avoided. This notably increases the strength of the device and its resistance to fatigue.

A further important advantage is to be found in the use of very simple mechanisms in comparison with the conventionally described solutions. The proposed solution is based principally on traditional pantograph type mechanisms, the robustness of which has been widely proven on production vehicles on the market.

Likewise, the solution according to the invention notably facilitates the replacement of the wiper blade.

The proposed solution also provides a high degree of flexibility, since it allows one same mechanical device to be adapted to quite different windshield profiles, simply by changing the toothed members.

On the other hand, it should be pointed out that, in the invention, the fact that the second toothed member is integral with the wiper blade should not be understood to be a limitation. The idea of "integral" in the invention relates to the fact that the rocking movement for compensation in the attack angle of the wiper blade performed by the toothed member and the wiper blade is the same. The fact that the second toothed member is integral with the wiper blade does not exclude the wiper blade from being capable of rocking, for example, along an axis transverse to the longitudinal direction thereof or that the wiper blade, thanks to the elasticity thereof, can adapt itself in the longitudinal direction to the geometry of the vehicle windshield. Thus, the toothed member integral with the wiper blade should not be understood in the sense that they are completely rigid relative to one another, but simply that the toothed member can transmit the rocking movement to the wiper blade.

The invention further includes a number of preferred features that are object of the dependent claims and the utility of which will be highlighted hereinafter in the detailed description of an embodiment of the invention.

In order to improve the robustness of the assembly, in one embodiment, it is contemplated that the device further comprises a support member, said second toothed member being fixedly mounted in said support member and said wiper blade being rockingly mounted on said support member about an axis transversal to the longitudinal direction of said wiper blade.

Furthermore, one of the important requirements of the invention is that the proposed solution be as compact as possible. To this end, in a preferred embodiment, said first toothed member is a straight rack and said second toothed member is a toothed circular segment. Thanks to this, the space occupied by the device is reduced. On the other hand, the rack and pinion gear system is optimized to perform a small translation at the same time as it performs the typical rotation as a gear, in a robust mechanical environment free from the need for lubrication and/or costly sealing.

In another preferred embodiment, the windshield wiper device comprises longitudinal walls adjacent both sides of said first or second toothed members, said longitudinal walls having a height such that in the engaged state of said first and second toothed members it is at least the same as the height of the teeth of said first and second toothed members. These longitudinal walls provide protection for the rocking means against the ingress of solid matter that could reach the windshield area. On the other hand, there is also achieved a reduction of the exposure of members liable to degradation for effects of weathering.

Also with a view to simplifying and reinforcing the windshield wiper device, in another embodiment, the first or second toothed members include said longitudinal walls forming an integral part.

Another problem envisaged by the invention is that the assembly and dismounting of the wiper blade should be as easy as possible. To this end, the secondary spacer is preferably farther removed from said proximal end than said main spacer, which facilitates the handling of the wiper blade during assembly and dismounting thereof and the engagement of the toothed members, since the toothed members are more accessible than in the contrary position.

The invention also contemplates the problem of increasing the efficiency in the cleaning of the windshield. Thus, in another particularly preferred embodiment, the windshield wiper device comprises a windshield wiper liquid spray member integral with said wiper blade and which comprises at least one windshield wiper liquid outlet, arranged to apply said windshield wiper liquid ahead of said wiper blade, in the direction of forward movement of said wiper blade. In this way, there is achieved a design without interference between the jet of windshield wiper liquid and the arms, or possible collisions between parts of the device.

Once again, the fact that the spray member is fixedly mounted on the wiper blade should not be understood in a limiting manner, since the integrality relates in particular to the fact that the wiper blade and the spray member can rock integrally during the compensation of the wiper blade attack angle. On the other hand, it is not essential for the spray member to rock with the wiper blade about an axis transverse to the longitudinal direction of the wiper blade.

In another preferred embodiment the spray member is mounted in the direction transversal to the longitudinal direction of said wiper blade.

Optionally, the windshield wiper liquid outlet is oriented such that in an operative position said windshield wiper liquid is applied substantially in the longitudinal direction of said wiper blade and in the opposite direction to the force of gravity. This configuration allows for maximum use of the windshield wiper liquid applied, since the upper portion of the windshield is wet and then the liquid flows under the effect of gravity to the lower portions.

Optionally, the windshield wiper device comprises two windshield wiper liquid outlets on opposite sides of said spray member and a lower outlet oriented towards said windshield, such that windshield wiper liquid is applied along the entire length of said wiper blade. This configuration is particularly advantageous for very dusty environments which require larger amounts of windshield wiper liquid, since windshield wiper liquid is applied simultaneously along the entire length of the wiper blade.

Finally, in another embodiment it is contemplated that said spray member comprises at least two windshield wiper liquid outlets arranged on both sides of said wiper blade, alternately operable to apply windshield wiper liquid ahead of said wiper blade in the direction of forward movement of said wiper blade. Thus, the liquid can be applied more efficiently depending on the corresponding direction of wiping.

Likewise, the invention also includes other features of detail illustrated in the detailed description of an embodiment of the invention and in the accompanying figures.

BRIEF DESCRIPTION OF THE DRAWINGS

Further advantages and features of the invention will become apparent from the following description, in which, without any limiting character, preferred embodiments of the invention are disclosed, with reference to the accompanying drawings in which:

FIG. 2 is an enlarged perspective view of the first toothed member of the windshield wiper device of FIG. 1.

FIG. 3 is an enlarged perspective view of the second toothed member of the windshield wiper device of FIG. 1.

FIG. 4 is a front perspective detail view of the distal portion of the windshield wiper device of FIG. 1.

FIG. 5 is a rear perspective detail view of the distal portion of the windshield wiper device of FIG. 1.

FIGS. 6A and 6B are schematic views from above of the windshield wiper device in a central position and in an end position, respectively.

FIGS. 7A and 7B are schematic front views of the windshield wiper device of FIGS. 6A and 6B in a central position and in an end position, respectively.

FIGS. 8A and 8B are kinematic diagrams seen from above of the windshield wiper device in a central position and in an end position, respectively.

FIGS. 9A and 9B are front kinematic diagrams of the windshield wiper device in a central position and in an end position, respectively.

DETAILED DESCRIPTION OF EMBODIMENTS OF THE INVENTION

Figure 1:
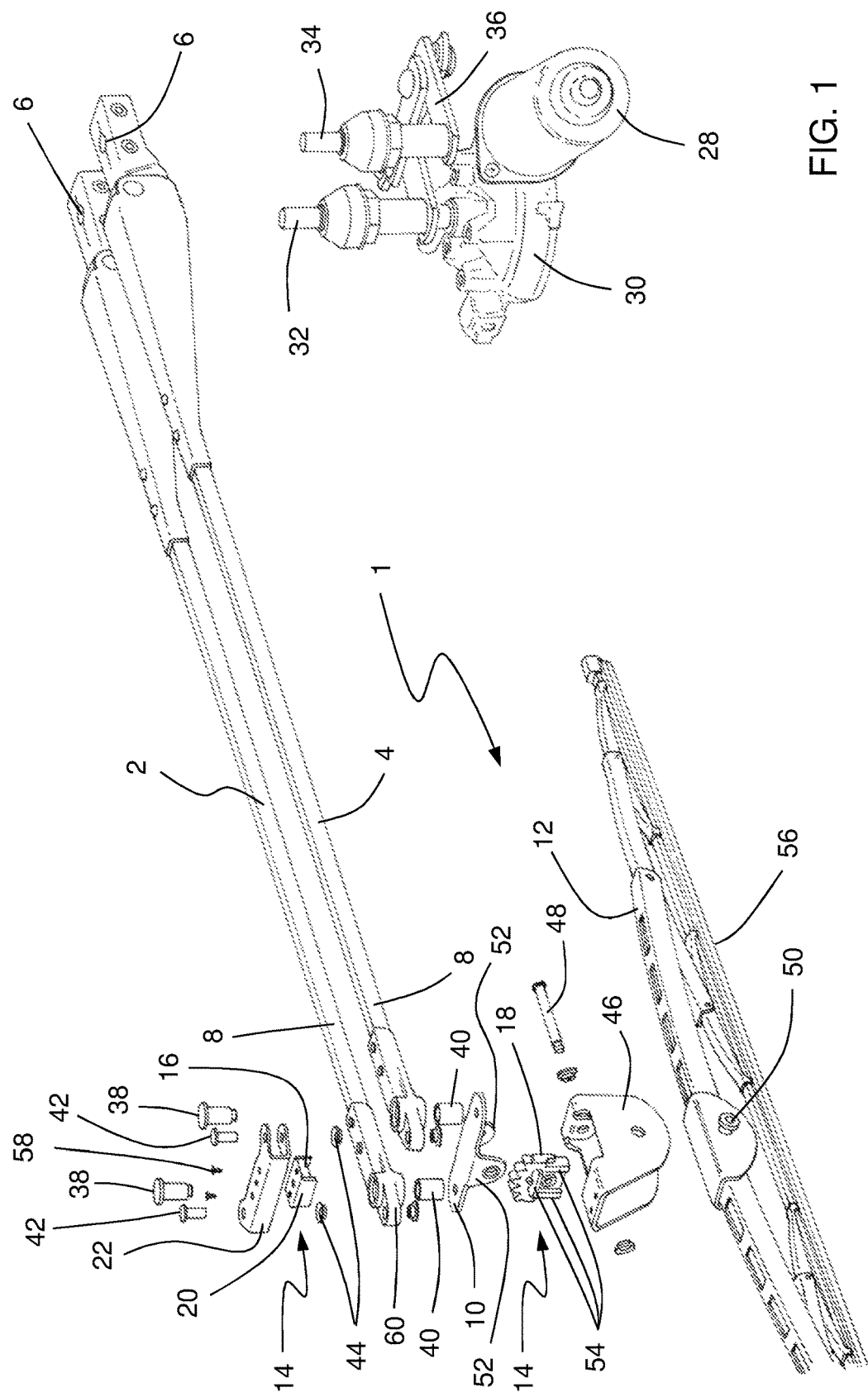
FIG. 1 is a schematic exploded perspective view of the windshield wiper device of the invention.

FIG. 1 shows the windshield wiper device 1 for large size curved windshields according to the invention.

The pantograph type device 1 comprises first and second arms 2, 4 made in the form of metallic rods defining two links of the kinematic chain. Both arms are hingedly connected together at the distal end 8 through the main spacer 10 by way of main pins 38 and main bearings 40. This main spacer 10 forms the link closing the kinematic chain of the four bar mechanism of the device 1. The main spacer 10 is made from a folded sheet with two assembly tabs 52 on which the longitudinal axis 48, around which the wiper blade 12 can rock to compensate the attack angle, may be mounted.

At the proximal end 6, namely the end opposite to the distal end 8, the first and second arms 2, 4 are fixedly mounted on first and drive shafts 32, 34. The first shaft 32 is the shaft of an assembly having a motor 28 and gear train 30. The second shaft 34 is attached to the first shaft 32 by means of a bar linkage mechanism 36. Through the motor 28, the gear train 30 and the bar mechanism 36, both shafts drive the first and second arms 2, 4 synchronously in a reciprocating movement.

At the distal end 8 and preferably at a position further removed from the proximal end 6 than the main spacer 10, the device 1 is provided with a secondary spacer 22. This is provided in extensions 60 projecting from the joints of the main spacer 10 in the first and second arms 2, 4. The secondary spacer 22 is also hinged relative to the arms by the secondary pins 42 and the secondary bearings 44.

Alternatively, the secondary spacer 22 may be closer to the proximal end 6 than the main spacer 10, but this configuration is less advantageous, since it complicates the assembly and accessibility of the assembly. This secondary spacer 22 is formed by a C-shaped sheet.

The secondary spacer 22 works redundantly with the main spacer 10 and the purpose thereof is to cause the rocking movement of the wiper blade 12 by way of the rocking means 14. This is to be seen in detail in FIGS. 6A to 9B and will be explained hereinafter.

The rocking means 14 are formed by first and second toothed members 16, 18 engaging one another. The first toothed member 16 is a straight rack which is fixedly mounted to the secondary spacer 22 through the screws 58. In turn, the second toothed member 18 is a toothed sector fixedly mounted to the wiper blade 12 for the rocking movement thereof to compensate the attack angle. Alternatively, the first toothed member 16 could be, for example, a crown gear.

As is to be seen in the figures, the wiper blade 12 is mounted in holes provided in the tabs of the U-shaped support member 46 by bolts 50, being able to rock around an axis transverse to the longitudinal direction thereof.

In order to achieve the rocking movement of the wiper blade 12 relative to the first and second arms 2, 4 for compensating the attack angle, the support member 46 holding the wiper blade 12 is rockingly mounted on the tabs 52 of the main spacer 10 through the axis 48.

Since it is fixedly mounted on the secondary spacer 22, the first toothed member 16 converts the reciprocating movement of the arms of the device 1 into a rocking movement, plus a slight movement of translation of the second toothed member 18, which is to be seen in FIGS. 6A to 9B. Thus, starting out from the central position of FIGS. 6A and 7A, when the arms are driven to the right of the figures, the secondary spacer 22 moves relative to the position of the axis 48 and this causes a rotational torque on the support member 46 which causes the rocking of the support member 46 and the wiper blade 12 about the axis 48 which is to be seen in FIGS. 6B and 7B. It is to be seen in them how the rocking occurs in the opposite direction to the reciprocating movement of the first and second arms 2, 4.

There is a quantifiable relationship between the stroke angle of the first and second arms 2, 4 and the leaning angle assumed by the support member 46 and, consequently, the attack angle of the wiper blade 12.

To this end, for a greater understanding of the mechanism, there is given with reference to FIGS. 1 and 8A to 9B a kinematic scheme where the different links (7 in all) are identified. The number of joints or kinematic pairs (9 in all) are identified with small letters, a, b, c, d, e, f, g, h, i, being distributed according to the following classes.

Rotary or lower pairs: a, b, c, d, e (*) f (*) h, i (8 in all, Class I, two redundant ones being indicated with the sign (*)).

Rolling and sliding or upper pairs: g (1 in all, Class V).

The mobility m of the device 1 according to Grubler's formula is:

$$m = 3(n-1) - 2j_1 - j_2$$

where n is the number of links, $j_1$ is the number of lower kinematic pairs (each one constrains two degrees of freedom on the plane) and $j_2$ the number of upper kinematic pairs (each one constrains one degree of freedom on the plane). Therefore, applied to the device 1:

$$m = 3(7-1) - 2(6-1) = 18 - 10 = 8$$

It is a mechanism of grade 8 (positive).

To determine the relationship between the wipe angle $\alpha$ of the arm and the attack angle $\beta$ the following formula is available:

$$\beta = \arctan(\text{DIR} \sin(\alpha))$$

Note that the attack angle $\beta$ and, consequently, the distance x can vary, by modifying the distance of the engagement R such than when R is increased, the attack angle $\beta$ is reduced or vice versa.

The lip 56 forms the wiping rubber profile which is located on the windshield surface. Thus, depending on the angular positions adopted by the support member 46, the lip 56 is positioned according to the desirable attack angle.

A further object of the invention is that the device should be as robust as possible and should allow operations in environments with demanding conditions such as dust, mud, branches or other agents highly prejudicial for the life of the device 1. To this end, in this case, the first toothed member 16, namely the rack, is provided with longitudinal walls 20 adjacent the teeth which are to be seen in detail in FIG. 2. Preferably, the longitudinal walls are arranged adjacent the rack forming an integral part. Nevertheless, these walls could be independent members. As is to be seen in this figure, these longitudinal walls 20 have such a height that in the engaged state of the first and second toothed members 16, 18 it is at least the same as the height of the corresponding teeth. It is also to be seen in this embodiment that the height of the longitudinal walls 20 is greater at the head of the teeth, whereby the engagement zone is perfectly protected against the entry of items such as branches or the rest and also greatly hinders the penetration of dust or mud.

It is to be seen in FIGS. 4 and 5 that to improve the cleaning of the device 1, there is provided a spray member 24 for windshield wiper liquid integral with the wiper blade 12. The spray member 24 is arranged transversely to the longitudinal direction of the wiper blade 12. On the other hand, in the preferred embodiment of FIGS. 4 and 5, the spray member 24 is provided with six windshield wiper liquid outlets 26, arranged to apply windshield wiper liquid ahead of said wiper blade 12, in the forward moving direction thereof. Thanks to this configuration, the spray member 24 rocks with the wiper blade 12 during the modification of the attack angle in a fixed position. Consequently, the jets ejected by the spray member 24 are always applied in a constant position relative to the wiper blade 12 and therefore the efficiency of cleaning is maintained constant for any attack angle assumed by the wiper blade in its entire windshield wiping stroke.

In order to optimize the washing capacity of the spray member, four of the windshield wiper liquid outlets 26 are oriented to apply the liquid in the longitudinal direction of the wiper blade 12. Thus, the two outlets 26 of FIG. 4 eject the jet of windshield wiper liquid in the opposite direction to the force of gravity, such that the jet in the operative and assembled position of the device 1 is always ejected at least upwards. In turn, the two rear outlets 26, to be seen in FIG. 5, eject the jet towards the proximal end 6. On the other hand, the spray member 24 is also provided with lower outlets 26 ejecting the jet in a direction substantially perpendicular to the windshield. In any case, for reasons of efficiency, it is preferred that in the embodiments having a single outlet 26 the windshield wiper liquid is always ejected in the direction opposite to the force of gravity to take maximum advantage of the liquid.

In this case, in spite of it not being essential for the invention, the spray member comprises windshield wiper liquid outlets 26 which can apply liquid to both sides of the wiper blade 12. Thus, windshield wiper liquid is applied along the entire length of the wiper blade 12.

The embodiments described this far represent non-limiting examples, such that the man of the art will understand that beyond the examples shown, multiple combinations among the claimed features are possible within the scope of the invention.

The invention claimed is:

1. A windshield wiper device for large size curved windshields comprising:
   [a] first and second arms hingedly connected to each other at at respective distal ends by a main spacer, said first and second arms being reciprocatingly operable at respective proximal ends and
   [b] a windshield wiper blade rockingly mounted about a longitudinal axis relative to said main spacer through rocking means
characterized in that the wiper device further comprises
   [c] a secondary spacer hingedly mounted on said respective distal ends and which works redundantly with said main spacer, in that
   [d] said rocking means comprise:
      [i] a first toothed member integral with said secondary spacer and
      [ii] a second toothed member integral with said wiper blade, and in that said first and second toothed members are mounted meshed with one another to cause a rocking of said wiper blade about said longitudinal axis in a rocking direction opposite to a direction of reciprocating movement of said first and second arms.

2. A windshield wiper device of claim 1, further comprising a support member, said second toothed member being fixedly mounted in said support member and said wiper blade being rockingly mounted on said support member about an axis transverse to a longitudinal direction of said wiper blade.

3. A windshield wiper device according to claim 1, characterized in that said first toothed member is a straight rack and said second toothed member is a toothed circular segment.

4. A windshield wiper device according to claim 1, further comprising longitudinal walls adjacent both sides of said first or second toothed members, said longitudinal walls having a height such that in the engaged state of said first and second toothed members they are at least the same as a height of the teeth of said first and second toothed members.

5. A windshield wiper device according to claim 4, characterized in that said first or second toothed members include said longitudinal walls forming an integral part.

6. A windshield wiper device according to claim 1, characterized in that said secondary spacer is farther removed from said proximal ends than said main spacer.

7. A windshield wiper device according to claim 1, further comprising a windshield wiper liquid spray member integral with said wiper blade and which comprises at least one windshield wiper liquid outlet, arranged to apply a windshield wiper liquid ahead of said wiper blade, in a direction of forward movement of said wiper blade.

8. A windshield wiper device according to claim 7, characterized in that said spray member is mounted in a direction transversal to a longitudinal direction of said wiper blade.

9. A windshield wiper device according to claim 8, further comprising two windshield wiper liquid outlets on opposite sides of said spray member and a lower outlet oriented towards said windshield, such that windshield wiper liquid is applied along an entire length of said wiper blade.

10. A shield wiper device according to claim 7, characterized in that said windshield wiper liquid outlet is oriented such that in an operative position said windshield wiper liquid is applied substantially in a longitudinal direction of said wiper blade and in an opposite direction to a force of gravity.

11. A windshield wiper device according to claim 10, characterized in that said spray member comprises at least two windshield wiper liquid outlets arranged on both sides of said wiper blade, alternately operable to apply windshield wiper liquid ahead of said wiper blade in the direction of forward movement of said wiper blade.

* * * * *

UNITED STATES PATENT AND TRADEMARK OFFICE
CERTIFICATE OF CORRECTION

PATENT NO. : 10,286,878 B2  
APPLICATION NO. : 15/517667  
DATED : May 14, 2019  
INVENTOR(S) : Josep Biosca Munts et al.

Page 1 of 1

It is certified that error appears in the above-identified patent and that said Letters Patent is hereby corrected as shown below:

In the Claims

Column 7, Line 40 (Claim 1): Remove second occurrence of "at"; and

Column 8, Line 42 (Claim 10): Replace "shield" with --windshield--.

Signed and Sealed this  
Second Day of July, 2019

Andrei Iancu  
*Director of the United States Patent and Trademark Office*